(12) United States Patent
Hein

(10) Patent No.: US 7,930,935 B2
(45) Date of Patent: Apr. 26, 2011

(54) METHOD FOR CONTROLLING THE LEVEL OF A MOTOR VEHICLE BODY

(75) Inventor: Dierk Hein, Wedemark (DE)

(73) Assignee: Continental Aktiengesellschaft, Hannover (DE)

( * ) Notice: Subject to any disclaimer, the term of this patent is extended or adjusted under 35 U.S.C. 154(b) by 178 days.

(21) Appl. No.: 12/441,411

(22) PCT Filed: Jul. 13, 2007

(86) PCT No.: PCT/EP2007/057226
§ 371 (c)(1),
(2), (4) Date: Mar. 16, 2009

(87) PCT Pub. No.: WO2008/031656
PCT Pub. Date: Mar. 20, 2008

(65) Prior Publication Data
US 2009/0266152 A1    Oct. 29, 2009

(30) Foreign Application Priority Data
Sep. 16, 2006   (DE) .......................... 10 2006 043 607

(51) Int. Cl.
*G01M 17/04*    (2006.01)
(52) U.S. Cl. .................................... 73/117.03
(58) Field of Classification Search ................ 73/117.03
See application file for complete search history.

(56) References Cited

U.S. PATENT DOCUMENTS

| | | | |
|---|---|---|---|
| 3,603,611 A * | 9/1971 | Wenham ..................... | 267/64.16 |
| 4,354,693 A * | 10/1982 | Maeda et al. ............... | 267/64.21 |
| 4,390,187 A * | 6/1983 | Maeda ........................ | 280/6.159 |
| 4,441,357 A * | 4/1984 | Kahn et al. ........................ | 73/40 |
| 4,462,610 A * | 7/1984 | Saito et al. .................. | 280/6.159 |
| 4,517,832 A | 5/1985 | Holland et al. | |
| 4,591,185 A * | 5/1986 | Natsume et al. ........... | 280/6.157 |
| 5,267,466 A * | 12/1993 | Morris .......................... | 73/1.81 |
| 5,272,647 A | 12/1993 | Hayes | |
| 5,461,564 A * | 10/1995 | Collins et al. .................... | 701/37 |
| 5,471,400 A * | 11/1995 | Smalley et al. .................. | 702/51 |
| 6,111,514 A | 8/2000 | Crossing et al. | |
| 6,796,163 B2 * | 9/2004 | Kutscher et al. ............. | 73/11.01 |
| 2002/0189331 A1* | 12/2002 | Kutscher et al. ............. | 73/118.1 |
| 2007/0068182 A1* | 3/2007 | Folchert et al. .............. | 62/228.1 |
| 2010/0063689 A1* | 3/2010 | Hein .............................. | 701/49 |

FOREIGN PATENT DOCUMENTS

| | | |
|---|---|---|
| DE | 4227470 | 2/1994 |
| DE | 10126458 | 12/2002 |
| JP | 62096126 | 5/1987 |
| WO | WO2008/031656 | 3/2008 |

* cited by examiner

*Primary Examiner* — Freddie Kirkland, III

(57) ABSTRACT

Disclosed is a method for diagnosing the function of a level control system (1) of a motor vehicle, comprising at least one valve (2a, 2b, 14, 26) and a control unit (10). An exchange of pressure medium from one side of the valve to the other side of the valve is possible when the valve is open, and an exchange of pressure medium is prevented when the valve is closed. The valve carries out a change of state, a variable (4, I) influencing the valve output is measured during the change of state, the measured variable influencing the output of the valve is compared with a reference curve, a family of characteristics or a limit value in the control unit (10), and based on the comparison in the control unit (10) it can be established if the valve has carried out the change of state.

15 Claims, 2 Drawing Sheets

METHOD FOR CONTROLLING THE LEVEL OF A MOTOR VEHICLE BODY

BACKGROUND OF THE INVENTION

The invention relates to a method for diagnosing the functioning of a level control system of a motor vehicle, comprising at least one valve, an exchange of pressure medium from the one side of the valve to the other side of the valve being possible when the valve is open and an exchange of pressure medium being prevented when the valve is closed, and comprising a control unit.

Known from DE10126458C2 is a method for testing sealing and functioning wherein, in a first step, a non-return valve being open, there is set at the individual pneumatic spring a stroke at which at least one damping element is compressed, and wherein, in a second step, after the closing of the non-return valve, the individual pneumatic spring is set to a partial stroke of its total stroke between the damping elements, and wherein, in a third step, after the opening of the non-return valve, the ensuing distance between axle and vehicle body is ascertained with the aid of the measuring device and compared with a reference value. A disadvantage of this method is that it is necessary for relatively time-consuming level control operations to be performed for functional testing.

A method of the type stated at the beginning is known from the printed publication DE19959012C2. The method, known from this printed publication, for open-loop and/or closed-loop control of the level of a vehicle body of a motor vehicle is performed by means of a level control system comprising actuators, by means of which the level of the vehicle body can be lowered by discharging an actuating medium from the actuators. In the case of the known method for identifying a malfunctioning of the level control system, the level of the vehicle body is ascertained in relation to a reference point, a discharge operation is initiated if the level that has been ascertained is above a predefined level, it being checked in the control unit, after initiation of the discharge operation, whether after a time period the vehicle body has become lower in relation to the level ascertained immediately before the discharge operation, and the control unit terminating the discharge operation if this is not the case within the time period. The time period is in the range of a plurality of seconds and above.

A disadvantage of the known method is that it takes a relatively long time until a defective functioning of the level control system is identified, and the vehicle may possibly incur damage during this time period. It is also a disadvantage that a malfunctioning of the level control system can be identified only upon discharging. Further, the known method does not permit any inference concerning the cause of the defective functioning, and terminates the level control operation immediately, and possibly does not permit any further level control operation, since the cause is unknown. A discharge operation terminated according to the known method can have a plurality of causes, e.g. lifting by means of a vehicle jack, resting on an object, a blocked discharge line or also, alternatively, a defective control line or a defective valve.

Object of the invention is to create an improved method for the rapid identification of a defective functioning of a level control system, whereby the cause of the fault can at least be localized.

SUMMARY OF THE INVENTION

The object is achieved with the following steps:
the valve performs a change of state,
a quantity influencing the output of the valve is measured during the change of state,
in the control unit, the measured quantity influencing the output of the valve is compared with a reference curve, a family of characteristics or a limit value,
it can be ascertained in the control unit, on the basis of the comparison, whether the valve has performed the change of state.

Each level control system of a motor vehicle has valves that are arranged, as non-return valves, for example, in the pressure-medium line between the pressure source or the pressure sink and an actuator, to enable the inflow and outflow of pressure medium from the pressure source or the pressure sink to and from the actuator to be controlled. There are further known so-termed switchover valves, which can influence the direction of flow of the pressure medium in the pressure lines. If the level control system is realized as a pneumatic suspension system, then for reasons of comfort the pneumatic springs are to an increased extent connected to supplementary volumes, the switching-in and switching-out of the connection between the actuator "pneumatic spring" and the corresponding supplementary volume being effected by valves. Owing to the rapid and reliable switching activity, it is primarily solenoid valves that are used for the aforementioned tasks in level control systems. These solenoid valves are used, in standard manner, as normally closed valves, but it is also possible to use normally open solenoid valves.

The advantage of the invention is that a malfunctioning of a solenoid valve in a level control system can be identified very rapidly, and without additional sensors. A defective solenoid valve may have, for example, a line break in the magnet coil, or a jammed or immobile stroke armature. The possible reaction time is in the millisecond range of, for example, 10 ms, but at least within a time period of 1 second of the intended change of state, for example from closed to open, or vice versa. A very rapid reaction of the level control system to a malfunctioning is thus possible, in order to prevent possible travel-critical situations or damage to the vehicle or persons resulting from unwanted level control actions of a defective level control system. Conceivable as a reaction is a limited functionality, depending on which valve has the identified malfunctioning, or the level control system being put out of operation.

According to a development of the invention, the quantity influencing the output of the valve is the electric current consumed by the valve. During the switching-on operation and switching-off operation, the electric current progression of a solenoid valve has a characteristic progression that can be ascertained with high accuracy by the control unit through simple means. From the electric current progression during the switching-on operation or during the switching-off operation, it is possible to identify with sufficient accuracy the faultless or defective functioning of a valve in comparison with a reference curve, a family of characteristics stored in the control unit, or a limit value of the electric current, e.g. the gradient per unit of time.

According to a development of the invention, the measured electric current progression of the valve constitutes a measure of the travel of an armature of the valve. The armature of a solenoid valve constitutes the only movable component of the latter, and is thus subject to a particular mechanical stress, e.g. through wear, jamming, blocking or immobilization, and is therefore particularly liable to a malfunctioning that can now be rapidly and reliably identified.

According to a development of the invention, the opening behavior of the valve can be ascertained from the electric current progression of the valve during the pickup delay time and/or the pickup time. The pickup delay time represents the time from the application of the switching voltage to the valve until the armature is lifted again from the first valve seat. The pickup time is a measure of the instant at which the armature lifts from the first valve seat until the instant at which the armature has reached the second valve seat for the first time, and the change of state of the valve has therefore practically been executed. The advantage of this development consists in that the time for identification of the malfunctioning of a, in particular normally closed, valve, is reduced to a minimum.

According to a development of the invention
the valve is brought from its closed state into the open state,
the electric current progression of the valve is measured during the switching-on operation,
in the control unit, the measured electric current progression is compared with an electric current reference curve, a family of electric current characteristics or an electric current limit value,
it can be ascertained in the control unit, on the basis of the comparison, whether the valve has been brought from the closed into the open state.

The advantage of this development consists in that the malfunctioning of a valve can be identified easily and reliably, and the time for identification of the malfunctioning of a normally closed valve is reduced to a minimum.

According to a development of the invention, the quantity influencing the output of the valve is the voltage applied to the valve. During the switching-off operation, the voltage progression of a solenoid valve has a characteristic progression that can be ascertained with high accuracy by the control unit through simple means. From the voltage progression during the switching-off operation, it is possible to identify with sufficient accuracy the faultless or defective functioning of a valve in comparison with a reference curve, a family of characteristics stored in the control unit, or a limit value of the voltage, e.g. the gradient per unit of time.

According to a development of the invention, the measured voltage progression of the valve constitutes a measure of the travel of an armature of the valve. The armature of a solenoid valve constitutes the only movable component of the latter, and is thus subject to a particular mechanical stress, e.g. through wear, jamming, blocking or immobilization, and is therefore particularly liable to a malfunctioning that can now be rapidly and reliably identified.

According to a development of the invention, the closing behavior of the valve can be ascertained from the voltage progression of the valve during the dropout delay time and/or the dropout time. The dropout delay time represents the time from the interruption of the switching voltage at the valve until the armature is lifted again from the second valve seat. The dropout time is a measure of the instant at which the armature lifts from the second valve seat until the instant at which the armature has reached the first valve seat, and the change of state of the valve has therefore practically been executed. The advantage of this development consists in that the time for identification of the malfunctioning of a, in particular normally closed, valve, is reduced to a minimum.

According to a development of the invention, the closing behavior of the valve can be ascertained from the measured voltage progression and the measured electric current progression during the switching-off operation of the valve. The advantage of the development according to the invention consists in that the dropout delay time and/or the dropout time of the valve, or of the armature of the valve, can be ascertained very accurately, since the instant of lifting of the armature from the second valve seat can be determined very accurately with the aid of the electric current progression.

According to a development of the invention,
the valve is brought from its open state into the closed state,
the voltage progression is measured during the switching-off of the valve,
in the control unit, the measured voltage progression is compared with a voltage reference curve, a family of voltage characteristics or a voltage limit value,
it can be ascertained in the control unit, on the basis of the comparison, whether the valve has been brought from the open into the closed state.

The advantage of this development consists in that the malfunctioning of a valve can be identified easily and reliably, and the time for identification of the malfunctioning of a normally closed valve is reduced to a minimum.

According to a development of the invention, the opening behavior of the valve can be ascertained from the electric current progression during the switching-on operation of the valve and the closing behavior of the valve can be ascertained from the voltage progression during the switching-off operation of the valve. The advantage of this development consists in that both essential functions of the valve, switching-on and switching-off, can be diagnosed reliably and rapidly in respect of a malfunctioning. The perfect switching-on, and thereby the functioning of a valve, can be prevented by, for example, jamming of the armature or an immobilized armature, or the like. The perfect switching-off, and thereby the functioning of a valve, can be prevented by, for example, jamming of the armature or a blocked valve seat, or the like.

According to a development of the invention, the diagnosis of the opening and closing behavior of the valve is effected during a level control operation. The advantage of this development consists in that it is not necessary for any special and additional control operations for the diagnosis of the functionality of the level control system to be carried out. Further, it is ensured that a corresponding diagnosis is effected at regular intervals, but at least whenever a level control action is to be performed.

According to a development of the invention, the switching-on and/or switching-off of the valve is effected transiently. The advantage of this development consists in that, even in the case of a merely transient operation of a valve and/or of the level control system, a malfunctioning of same can be identified reliably and rapidly.

According to a development of the invention, the switching-on and/or switching-off of the valve is effected only for diagnostic purposes. The advantage of this development consists in that the functional capability can be performed and at defined and possibly regularly recurring instants and independently of other functions. For example, a diagnosis of the level control system, according to the invention, can be performed before or after each level control operation, once per day or on each occasion before commencement of travel.

According to a development of the invention, the switching-on and/or switching-off of the valve is effected directly after the switching-on of the ignition of the motor vehicle. The advantage of this development consists in that the functioning of the level control system is checked before or upon each instance of the motor vehicle being put into operation. It is thereby ensured that no unwanted level control operations can be performed by the level control system as a result of a malfunctioning.

Exemplary embodiments and further advantages of the invention are explained with reference to the appended figures.

DETAILED DESCRIPTION OF THE DRAWINGS

Figure 1:
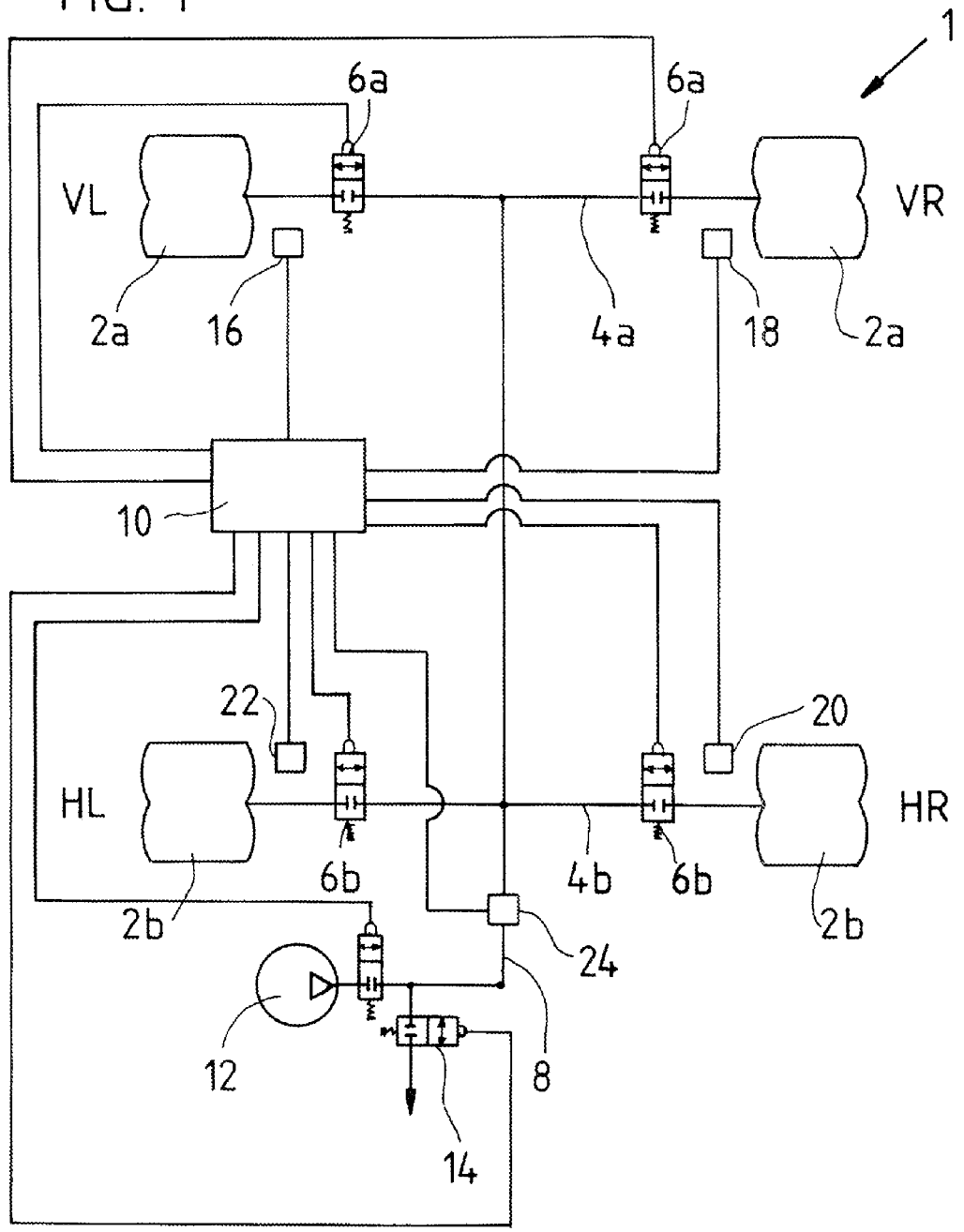
FIG. 1 shows a schematic representation of a level control system.

FIG. 1 shows a highly schematic representation of a level control system 1 for a motor vehicle, only the components necessary for the following explanations being shown. Such level control systems 1 are known per se, such that same are to be explained only briefly here. The level control system 1 has pneumatic springs 2a, which are assigned to the front axle of the motor vehicle, and has pneumatic springs 2b, which are assigned to the rear axle of the motor vehicle. A vehicle body (not shown) of the motor vehicle is spring-mounted by means of the pneumatic springs 2a, 2b. The pneumatic springs 2a are connected to each other via a transverse line 4a, and the pneumatic springs 2b are connected to each other via a transverse line 4b. Each transverse line 4a, 4b includes, respectively, two transverse non-return valves 6a, 6b, of which respectively one is assigned to a pneumatic spring 2a, 2b. Furthermore, the transverse lines 4a, 4b are connected to a further line 8, via which the pneumatic springs 2a, 2b are filled with compressed air and via which the compressed air is discharged from the pneumatic springs 2a, 2b.

For the purpose of filling up the pneumatic springs 2a, 2b, the transverse non-return valves 6a, 6b and the valve 32 are actuated by the control unit 10 of the level control system, such that these valves change from the basic state, shown in FIG. 1, to their other switching state, and "connect through" the transverse lines 4a and 4b. The compressor 12 is thereupon actuated by the control unit 10, such that this compressor delivers compressed air into the pneumatic springs 2a, 2b. For the purpose of terminating the filling-up operation, the compressor 12 is stopped by the control unit 10 and the transverse non-return valves 6a, 6b and the valve 32 are actuated by the control unit, such that they assume the basic state shown in FIG. 1.

For the purpose of discharging compressed air from the pneumatic springs 2a, 2b, the transverse non-return valves 6a, 6b are actuated by the control unit 10 such that they change from the basic state, shown in FIG. 1, to the open switching state. Furthermore, the control unit 10 actuates the discharge valve 14 such that the latter changes from the basic state, shown in FIG. 1, to the open switching state, in which it connects the line 8 to the atmosphere. The pneumatic springs 2a, 2b are then connected to the atmosphere via the transverse non-return lines 4a, 4b and via the line 8, such that compressed air is discharged from the pneumatic springs. In order to end or terminate a discharge operation, the transverse non-return valves 6a, 6b and the discharge valve 14 are closed by the control unit 10, such that these valves then change back to the basic state shown in FIG. 1.

Owing to differing axle loads, and consequently differing pressure in the pneumatic springs, the filling-up and discharging is effected axle-wise.

It is likewise possible, through corresponding actuation of the transverse non-return valves 6a, 6b and of the discharge valve 14, to discharge compressed air from one pneumatic spring or from any combination of pneumatic springs (for example, from the pneumatic springs that are assigned to an axle). In order to discharge compressed air from the pneumatic spring 2b that is assigned to the wheel position "rear left", it is necessary, for example, for the transverse non-return valve 6b assigned to this pneumatic spring 2b, and the discharge valve 14 to be brought from the basic state shown in FIG. 1 to the open switching state. If, additionally, air is to be from the pneumatic spring 2b that is assigned to the wheel position "rear right", then it is additionally necessary for the transverse non-return valve 6b assigned to this pneumatic spring 2b to be brought from the closed basic state, shown in FIG. 1, to the other, open switching state.

In addition to the components mentioned hitherto, the level control system has height sensors 16, 18, 20 and 22, of which, respectively, one is assigned to a pneumatic spring 2a, 2b of the level control system. With the aid of the height sensor 16, the current level of the vehicle body in the region of the wheel position "front left" can be measured at any time, in relation to a reference point. This applies, correspondingly, to the height sensors 18, 20 and 22. The current level measured by the height sensors 16, 18, 20 and 22 is transmitted by the latter to the control unit 10 of the level control system, and evaluated therein. There is therefore available in the control 10, at any instant, information on which current level is assumed by the vehicle body in the region of the wheel positions of the vehicle body, in relation to a predefined reference point. Furthermore, through averaging of the measurement values of the corresponding height sensors, it can be ascertained in the control unit 10 which current level is assumed on average by the vehicle body in relation to an axle of the motor vehicle. If, for example, the level of the vehicle body in relation to the rear axle is to be determined, the measurement values that have been transmitted to the control unit 10 by the height sensors 20 and 22 are averaged in the control unit 10.

It is checked continuously in the control unit 10 whether the current level of the vehicle body in the region of a wheel position, or the current level of the vehicle body in relation to an axle of the motor vehicle, corresponds to a predefined level stored in the control unit 10 (understood as the current level is the last to be in the control unit 10 on the basis of the measurement signals transmitted by the height sensors 16, 18, 20 and 22). If the current level is above the predefined level stored in the control unit 10, the control unit 10 initiates a discharge operation. For this purpose, the corresponding transverse non-return valves 6a, 6b and the discharge valve 14 are switched, as already explained above. The discharge operation is ended when the control unit 10 establishes that the current level corresponds to the predefined level stored in the control unit 10. The control unit 10 then brings the corresponding transverse non-return valves 6a, 6b and the discharge valve 14 back into the basic state shown in FIG. 1.

It can also happen that the control unit 10 establishes that the level of the vehicle body is not lowered as expected during a discharge operation, because the motor vehicle is in a critical situation. In this case, the control unit 10 terminates the discharge operation, as explained in detail further below.

The level control system may also comprise, finally, a pressure sensor 24, by means of which the air pressure can be measured in each individual pneumatic spring 2a, 2b of the level control system. For the purpose of measuring the air pressure in the pneumatic springs 2b that is assigned to the wheel position "rear left", the transverse non-return valve 6b assigned to this pneumatic spring 2b is brought by the control unit from the closed basic state, shown in FIG. 1, to the other, open switching state, whereas all other valves of the level control system remain in the basic state shown in FIG. 1. In this case, there is applied at the pressure sensor 24 the static air pressure prevailing in the pneumatic spring 2b, which is assigned to the wheel position "rear left". Correspondingly, the air pressure in the other pneumatic springs of the level control system can be measured. The respective measurement result of the pressure sensor 24 is transmitted to the control unit 10. In the control unit, the transmitted measurement result is assigned to the pneumatic spring 2a, 2b whose transverse non-return valve 6a, 6b has been actuated by the control unit, and is evaluated. How this is effected in detail is explained more fully further below.

Each valve 6a, 6b, 14 is connected to the control unit 10 via a control line. Each valve 6a, 6b, 14 is supplied with voltage and electric current via the corresponding line, for the operation and changing of the switching position. The voltage applied to the valve 6a, 6b, 14 and the electric current consumed by each valve 6a, 6b, 14 can be determined and ascertained by the control unit 10. Further, a reference curve, a family of characteristics and/or at least one limit value for the voltage and the electric current of each valve 6a, 6b, 14 can be stored in the control unit 10.

It is explained in the following, with reference to FIG. 2, which shows in diagrammatic form the characteristic curves of, for example, a normally closed or normally open solenoid valve, how a diagnostic method is performed with the aid of the control unit 10 shown in FIG. 1. In the diagram, the progression of the voltage U, of the electric current I and of the armature travel S of a solenoid valve have been plotted over time.

At a first instant t1, a voltage U1 is applied. Owing to the inertia of the armature of the valve and the spring force that is possibly present and acting upon the armature of the valve, it takes until the instant t2 until the armature lifts from the first valve seat for the first time. The electric current increases continuously from the instant t1 to the instant t2, the so-termed pickup delay time, and attains a local maximum value at the instant t2. From the instant t2 to the instant t3, the so-termed pickup time, the armature of the valve lifts from the first valve seat and is moved as far as the second valve seat, the valve having performed a change of its switching state and the electric current decreasing continuously in this period and attaining a local minimum at the instant t3.

In the case of a perfect, functional solenoid valve, the electric current progression from the instant t1 to the instant t3 has a characteristic progression. If the functioning of the valve, in particular the complete opening and resting of the armature on the second valve seat, is impaired, then the measured values for the local maximum and the local minimum of the electric current deviate markedly from the reference values of a perfect valve, and can be used for diagnosis of the functional capability of the valve.

From the instant t3 to the instant t4, the bounce time, the armature may possibly "bounce" several times against the second valve seat, the electric current consumption of the valve already increasing continuously again. After the bounce time, the armature of the valve rests on the second valve seat for as long as the voltage U1 is applied to the valve, being, in this case, until the instant t5.

At the instant t5, the supply voltage to the valve is interrupted and decreases very greatly to a local minimum, owing to mutual induction. Thereafter, the voltage increases continuously, the armature of the valve lifting from the second valve seat after a certain time, in this case the instant t6, and being moved continuously as far as the first valve seat. As a result, the voltage attains a local maximum and, at the instant t7, when the armature of the valve rests on the first valve seat, falls back to a local minimum. The local maximum and the local minim of the voltage progression are characteristic quantities in the case of a perfect, functional valve. If the functioning of the valve, in particular the complete closing and resting of the armature on the first valve seat, is impaired, then the measured values for the local maximum and the local minimum of the voltage deviate markedly from the reference values of a perfect valve, and can be used for diagnosis of the functional capability of the valve.

In the case of the switching-off operation of the solenoid valve, it is additionally possible to use the electric current progression from the instant t5 to the instant t6 for diagnosis of the functional capability of the valve, since it is only at the instant t6, when the electric current progression has almost attained the value zero, that the armature lifts from the second valve seat. This information improves the diagnosis of the functional capability of the valve and provides more accurate results, since the travel of the armature from the start to the end can be verified on the basis of the electric current progression and the voltage progression.

Each solenoid valve has such a characteristic progression for voltage and electric current, that the functionality of the valve can be evaluated and ascertained through the measurement of voltage and/or electric current during the switching-on and/or switching-off operation in comparison with a corresponding reference characteristic, a family of characteristics or a limit value. If a measured voltage progression and/or electric current progression deviates too greatly from the corresponding reference values, then it is highly probable that the armature of the valve has not been opened or has not been properly opened, or has not been closed or has not been properly closed.

The correct functioning of a normally closed or normally open solenoid valve during the switching-on operation can be reliably ascertained by means of the electric current progression between the instants t1 and t4. The correct functioning of a normally closed or normally open solenoid valve during the cutoff or switching-off operation can be reliably ascertained by means of the voltage progression and possibly with use of the electric current progression between the instants t5 to t7.

Figure 2:
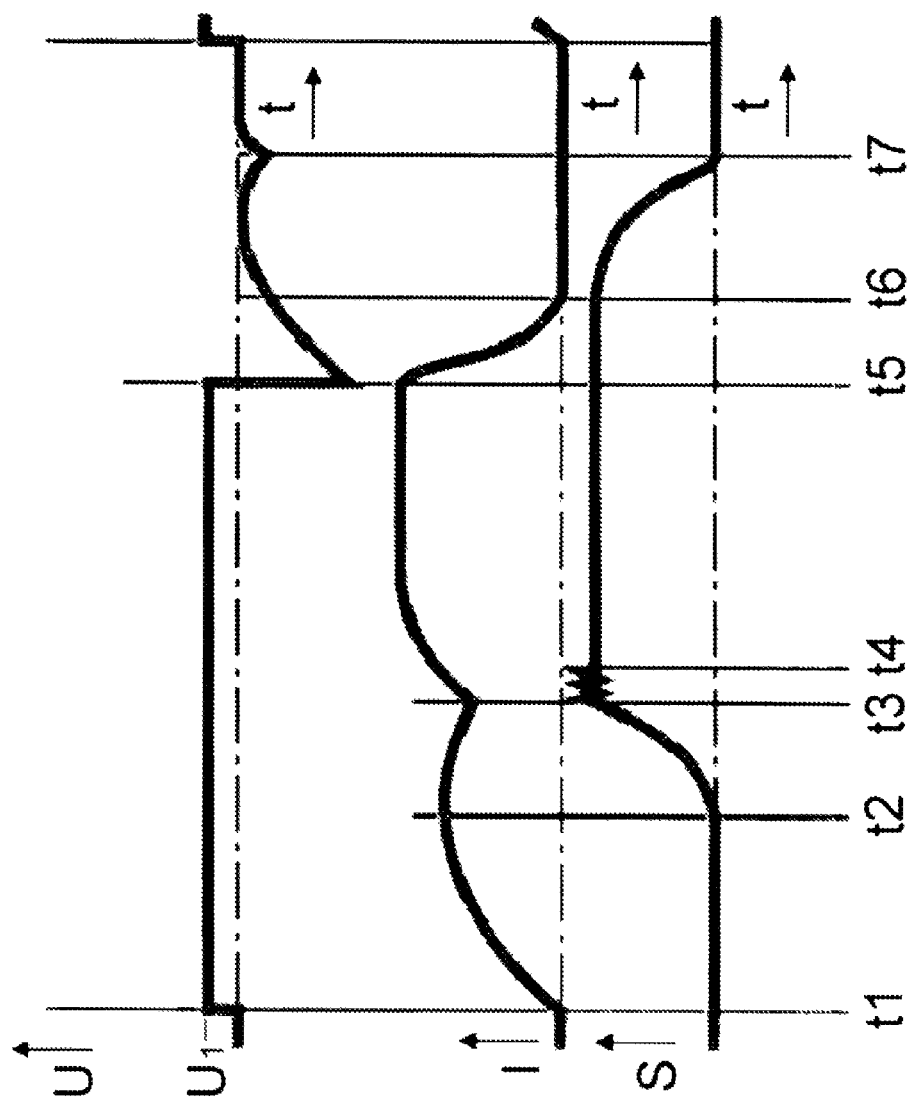
FIG. 2 shows a diagram.

The characteristics represented in the diagram of FIG. 2 are to be used for a normally closed solenoid valve in the range from t1 to t4 for the switching-on and opening behavior, and in the range from t5 to t7 for the cutoff and closing behavior. In the case of a normally open solenoid valve, the characteristics represented in the diagram of FIG. 2 in the range from t1 to t4 are to be used for the switching-on and closing behavior, and in the range from t5 to t7 for the cutoff and opening behavior.

LIST OF REFERENCE CHARACTERS (Part of the Description)
1—level control system
2a, 2b—pneumatic spring
4a, 4b—line
6a, 6b—valve
8—line
10—control unit
12—compressor
14—discharge valve
16, 18, 20, 22—height sensor
24—pressure sensor
26—valve
t1—first instant
t2—second instant
t3—third instant
t4—fourth instant
t5—fifth instant
t6—sixth instant
t7—seventh instant
U—voltage
U1—voltage value
I—electric current
S—travel (of the armature)

The invention claimed is:

1. A method for diagnosing the functioning of a motor vehicle level control system (1) comprising a control unit (10) and at least one electrically actuated valve (2a, 2b, 14, 26) with an open state permitting an exchange of pressure medium from the one side of the valve to the other side of the valve and with a closed state preventing an exchange of pressure medium, the method comprising the steps of changing the state of the valve (2a, 2b, 14, 26) while the valve is in the motor vehicle level control system of a motor vehicle during an operation of the motor vehicle, measuring at least one quantity (U, I) influencing the output of the valve (2a, 2b, 14, 26) during the change of state, making a comparison between the measured quantity (U, I) influencing the output of the valve (2a, 2b, 14, 26) and a reference, determining in the control unit (10), on the basis of the comparison, whether the valve (2a, 2b, 14, 26) has performed the change of state, wherein the reference is a member of the group consisting of an electric current reference curve, a family of electric current characteristics, and an electric current limit value and wherein the method is performed whenever a level control action is to be performed.

2. The method as claimed in claim 1, wherein an electric current flows through the valve and the at least one quantity (U, I) influencing the output of the valve (2a, 2b, 14, 26) is the electric current (I) flowing through the valve (2a, 2b, 14, 26).

3. The method as claimed in claim 2, comprising steps of measuring a progression of the electric current flowing through the valve and translating the measured electric current progression (I) of the valve (2a, 2b, 14, 26) into a measure of travel (S) of an armature of the valve (2a, 2b, 14, 26).

4. The method as claimed in claim 1, wherein the determination whether the valve (2a, 2b, 14, 26) has performed the change of state from its closed state to its open state is ascertained from the valve's (2a, 2b, 14, 26) pickup behavior.

5. The method as claimed in claim 1, wherein
the valve (2a, 2b, 14, 26) is changed from its closed state into the open state,
the quantity (U, I) influencing the output of the valve is an electric current progression (I) of the valve (2a, 2b, 14, 26) during the change of state.

6. The method as claimed in claim 1, wherein the at least one quantity (U, I) influencing the output of the valve (2a, 2b, 14, 26) is a progression of voltage (U) applied to the valve (2a, 2b, 14, 26).

7. The method as claimed in claim 6, comprising the steps of measuring a voltage progression of the valve and translating the measured voltage progression (U) of the valve (2a, 2b, 14, 26) into a measure of travel (S) of an armature of the valve (2a, 2b, 14, 26).

8. The method as claimed in claim 6, wherein the determination whether the valve (2a, 2b, 14, 26) has performed the change of state from its open state to its closed state is ascertained from a voltage progression (U) of the valve (2a, 2b, 14, 26) during a dropout.

9. The method as claimed in claim 6, wherein a closing behavior of the valve (2a, 2b, 14, 26) is ascertained from measuring the voltage progression (U) and from measuring an electric current progression (I) during a switching-off operation of the valve (2a, 2b, 14, 26).

10. The method as claimed in claim 1, wherein
the valve (2a, 2b, 14, 26) is changed from its open state into its closed state,
a voltage progression (U) is measured during the changing of the valve (2a, 2b, 14, 26) from its open state into the closed state.

11. The method as claimed in claim 1, wherein an opening behavior of the valve (2a, 2b, 14, 26) is ascertained from an electric current progression (I) during a switching-on operation of the valve (2a, 2b, 14, 26) and a closing behavior of the valve (2a, 2b, 14, 26) is ascertained from a voltage progression (U) during a switching-off operation of the valve (2a, 2b, 14, 26).

12. The method as claimed in claim 1 wherein a diagnosis of an opening and closing behavior of the valve (2a, 2b, 14, 26) is effected during a level control operation.

13. The method as claimed in claim 1, wherein the the change of state of the valve (2a, 2b, 14, 26) is effected temporarily.

14. The method as claimed in claim 13, wherein the change of state of the valve (2a, 2b, 14, 26) is effected specifically for diagnostic purposes.

15. The method as claimed in claim 13, wherein the change of state of the valve (2a, 2b, 14, 26) is effected immediately after the motor vehicle's ignition has been started.

* * * * *